United States Patent
Berger et al.

(10) Patent No.: US 6,814,339 B2
(45) Date of Patent: Nov. 9, 2004

(54) COAXIAL SOLENOID VALVE

(75) Inventors: Siegfried Berger, Schlierbach (DE); Joachim Forster, Winnenden (DE)

(73) Assignee: Karl Dungs GmbH & Co., Urbach (DE)

(*) Notice: Subject to any disclaimer, the term of this patent is extended or adjusted under 35 U.S.C. 154(b) by 0 days.

(21) Appl. No.: 10/472,606
(22) PCT Filed: Feb. 2, 2002
(86) PCT No.: PCT/DE02/00377
§ 371 (c)(1),
(2), (4) Date: Mar. 29, 2004
(87) PCT Pub. No.: WO02/077502
PCT Pub. Date: Oct. 3, 2002

(65) Prior Publication Data
US 2004/0149945 A1 Aug. 5, 2004

(30) Foreign Application Priority Data
Mar. 23, 2001 (DE) .......................... 101 14 175

(51) Int. Cl.[7] .................... F16K 31/02; F16K 1/44
(52) U.S. Cl. ................. 251/129.1; 251/129.15
(58) Field of Search ........................ 251/129.01–129.22

(56) References Cited

U.S. PATENT DOCUMENTS 4,546,955 A * 10/1985 Beyer et al. ........... 251/129.15
5,218,996 A * 6/1993 Schmitt-Matzon ..... 137/596.17
6,161,813 A * 12/2000 Baumgartner et al. ........ 251/50

FOREIGN PATENT DOCUMENTS

GB 1427360 * 3/1976
JP 10-196835 * 10/1998

* cited by examiner

Primary Examiner—Paul J. Hirsch
(74) Attorney, Agent, or Firm—Reed Smith LLP

(57) ABSTRACT

For a coaxial magnetic valve with an inner valve disk which can move in the axial direction, and with an outer valve disk which surrounds the inner valve disk and which can move in the axial direction, wherein these two valve disks are arranged coaxially to each other and each rises from its corresponding valve seat against the action of a closing spring, and with a magnetic drive for activating both valve disks, the magnetic drive includes two independent magnetic loops which are arranged one above the other in the axial direction, each of which has a coil, and they interact with two armatures which are arranged one above the other in the axial direction and which connect to the inner valve disk or to the outer valve disk, wherein the armature of the outer valve disk is penetrated by a connecting rod connecting the inner valve disk to its armature. With this double magnetic valve, each valve disk can be controlled separately.

16 Claims, 1 Drawing Sheet

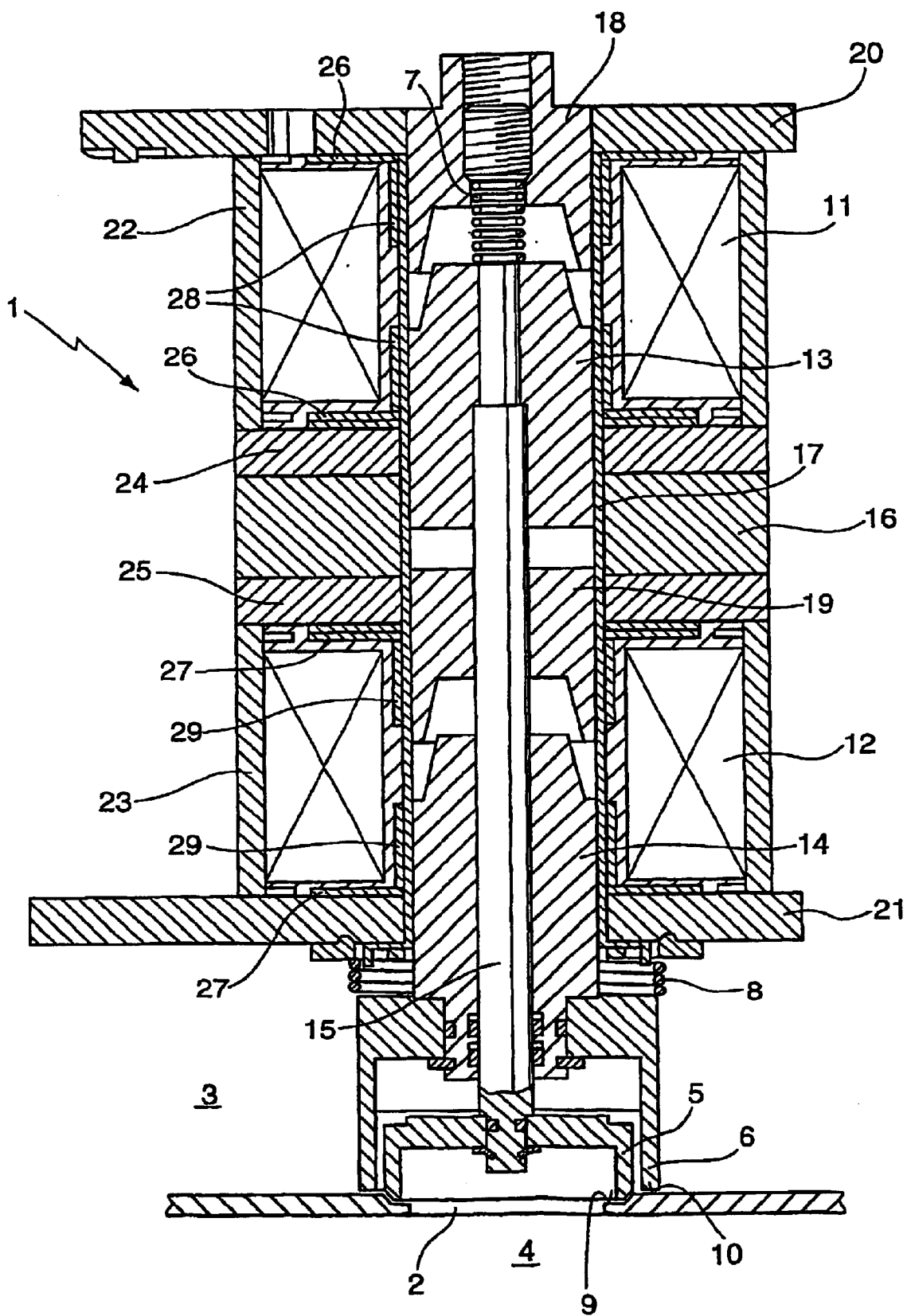

COAXIAL SOLENOID VALVE

CROSS REFERENCE TO RELATED APPLICATIONS

This application claims priority of PCT application no. PCT/DE02/00377, filed Feb. 2, 2002, which claims priority to German application no. 101 14 175.0, filed Mar. 23, 2001, all of which are incorporated herein by reference.

TECHNICAL FIELD OF THE INVENTION

The present invention is directed generally to a magnetic valve and more particularly to a double safety magnetic valve having two valves.

BACKGROUND OF THE INVENTION

The invention concerns a coaxial magnetic valve with an inner valve disk, which can move in the axial direction, and with an outer valve disk, which surrounds the inner valve disk and which can move in the axial direction. These two valve disks are arranged coaxially to each other and each rises from its corresponding valve seat against the action of a closing spring. The coaxial magnetic valve of the invention also has a magnetic drive for activating both valve disks.

Such a coaxial magnetic valve has become known, e.g., from DE 198 26 076 C1.

This known coaxial magnetic valve has a coil that acts on an armature connected to the inner valve disk. The outer valve disk engages behind the inner valve disk in the closing direction and is thus moved by the inner valve disk when the inner valve disk opens in the opening direction. Thus, the two valve disks can only be opened together, which means that a test of the seal of the intermediate space enclosed between both valve disks can be performed only at high technical expense.

Therefore, it would be desirable to provide a coaxial dual valve disk with the ability to control the two valve disks separately.

SUMMARY OF THE INVENTION

This problem is solved according to the invention in that the magnetic valve includes two independent magnetic loops which are arranged one above the other in the axial direction, each of which has a coil, and the magnetic loops interact with two armatures which are arranged one above the other in the axial direction and which are connected to the inner valve disk and to the outer valve disk, respectively. The armature of the outer valve disk is penetrated by a connecting rod connecting the inner valve disk to its armature.

The advantage achieved with the invention is that two valve disks arranged on a common axis can be activated independently of each other. This enables, in particular, a simple test of the seal of the intermediate space enclosed between both valve disks, as described, e.g., in DE 200 15 703 U1.

In a preferred embodiments of the invention, the outer valve disk and its armature are directly connected to each other.

Preferably, a nonmagnetic spacer is provided between the two magnetic loops to prevent one magnetic loop from affecting the other.

The two armatures can be guided in a nonmagnetic closed magnet sleeve, e.g., in a stainless steel pipe, or also in magnetic sleeves. One end of the closed magnet sleeve can be closed by the pole core for the armature of the inner valve disk and the pole core for the armature of the outer valve disk is mounted within the closed magnet sleeve, particularly forced into the sleeve, wherein the connecting rod then also penetrates the pole core for the armature of the outer valve disk. Preferably, the intermediate space between the inner and the outer valve disk is sealed by gaskets on the armature of the outer valve disk and on the connecting rod.

Additional advantages of the invention can be ascertained from the description and the drawing. Likewise, the previously mentioned features according to the invention and also those still to be described can be used individually or in arbitrary combinations. The shown and described embodiment is not to be understood as conclusive, but instead merely as an example for the description of the invention.

BRIEF DESCRIPTION OF THE DRAWING

The single FIGURE shows a longitudinal section of a coaxial magnetic valve according to the invention, whose valve opening separates a gas inlet space from a gas outlet space.

DETAILED DESCRIPTION OF THE INVENTION

The coaxial magnetic valve 1 includes an inner valve disk 5, which can move in the axial direction, and an outer valve disk 6, which surrounds the inner valve disk 5 and which can also move in the axial direction. These two valve disks are arranged coaxially to each other and each rises from its corresponding valve seat 9, 10 against the action of a closing spring 7, 8. To activate the valve disk 5, 6, there are two independent, coaxial magnetic loops which are arranged one above the other in the axial direction, each of which has a coil 11, 12, and they interact with two armatures 13, 14 arranged one above the other. One armature 13 is connected to the inner valve disk 5 by a connecting rod 15 and the other armature 14 is connected directly to the outer valve disk 6, wherein the connecting rod 15 passes through the armature 14 of the outer valve disk 6 concentrically. There is a nonmagnetic spacer 16 between the two magnetic loops to prevent one magnetic loop from affecting the other.

The two armatures 10, 11 are guided in a closed magnet sleeve 17 so that they can move in the axial direction. This sleeve is formed in the illustrated embodiment as a stainless steel pipe. At the top end in the FIGURE, the closed magnet sleeve 17 is sealed from the surroundings by the pole core 18 for the armature 13, while the pole core 19 for the armature 14 is forced into the closed magnet sleeve 17. The connecting rod 15 passes concentrically through this pole core. On the two ends, the closed magnet sleeve 17 is connected to the sleeve plates 20, 21.

A magnetic field generated by the coil 11 or 12 is guided through the iron circuit, which is formed from a pipe piece 22, 23 and a plate 24, 25. To be able to better focus the magnetic field, additional plates 26, 27 and guide sleeves 28, 29 are installed. To close the iron circuit, the armature 13 or 14 moves onto its corresponding pole core 18 or 19.

If current is fed through the coil 11, its magnetic field creates a magnetic force on the armature 13 against the closing spring 7, and the inner valve disk 5 opens. If current is fed through the coil 12, the magnetic field creates a magnetic force on the armature 14 against the closing spring 8, and the outer valve disk 6 opens. The two valve disks 2, 3 can thus be opened independently.

Various omissions, modifications, substitutions and changes in the forms and details of the device illustrated and in its operation can be made by those skilled in the art without departing in any way from the spirit of the present invention. Accordingly, the scope of the invention is not limited to the foregoing specification, but instead is given by the appended claims along with their full range of equivalents.

What is claimed is:

1. A coaxial magnetic valve comprising:

an inner valve disk which can move in an axial direction;

an outer valve disk which surrounds the inner valve disk and which can move in the axial direction wherein the two valve disks are arranged coaxially to each other and each rises from its corresponding valve seat against the action of a closing spring; and a magnetic drive for activating both valve disks, the magnetic drive including two independent magnetic loops which are arranged one above the other in the axial direction, each magnetic loop having a coil, the magnetic loops interacting with two armatures which are arranged one above the other in the axial direction and which are each connected to the inner valve disk or to the outer valve disk, wherein the armature of the outer valve disk is penetrated by a connecting rod connecting the inner valve disk to its armature.

2. The coaxial magnetic valve according to claim 1, wherein the outer valve disk and its armature are directly connected to each other.

3. The coaxial magnetic valve according to claim 1, wherein a nonmagnetic spacer is provided between the two magnetic loops.

4. The coaxial magnetic valve according to claim 1, wherein the two armatures are guided in a nonmagnetic closed magnet sleeve or in magnetic sleeves.

5. The coaxial magnetic valve according to claim 4, wherein the closed magnet sleeve or parts of this sleeve are formed as a stainless steel pipe.

6. The coaxial magnetic valve according to claim 4, wherein one end of the closed magnet sleeve is sealed by the pole core for the armature of the inner valve disk.

7. The coaxial magnetic valve according to claim 6, wherein the pole core for the armature of the outer valve disk is mounted in the closed magnet sleeve, in particular forced into the sleeve, and is penetrated by the connecting rod.

8. The coaxial magnetic valve according to claim 1, wherein the connecting rod penetrates the armature of the outer valve disk and/or its pole core concentrically.

9. The coaxial magnetic valve according to claim 1, wherein the intermediate space between the inner and outer valve disks is sealed by gaskets on the armature of the outer valve disk and on the connecting rod.

10. A coaxial magnetic valve comprising:

an inner valve disk movable in an axial direction;

an outer valve disk surrounding the inner valve disk and being movable in the axial direction wherein the inner and outer valve disks are arranged coaxially to each other; and a magnetic drive operable to activate one valve disk independent of the other valve disk, the magnetic drive including:

first and second magnetic loops arranged one above the other in the axial direction; and first and second armatures respectively connected to the inner valve disk and the outer valve disk, the first and second armatures being arranged one above the other in the axial direction and being respectively associated with the first and second magnetic loops.

11. The coaxial valve disk according to claim 10, further comprising a connecting rod connecting the inner valve disk to the first armature and penetrating the second armature connected to the outer valve disk.

12. The coaxial magnetic valve according to claim 10, wherein the outer valve disk and the second armature are directly connected to each other.

13. The coaxial magnetic valve according to claim 10, further comprising a nonmagnetic spacer disposed between the first and second magnetic loops.

14. The coaxial magnetic valve according to claim 10, further comprising a closed magnet sleeve guiding the first and second armatures.

15. The coaxial magnetic valve according to claim 14, further comprising a pole core for the first armature which seals one end of the closed magnet sleeve pole.

16. The coaxial magnetic valve according to claim 10, further comprising a connecting rod connecting the inner valve disk to the first armature and concentrically penetrating the second armature connected to the outer valve disk.

* * * * *